(12) United States Patent
Sato et al.

(10) Patent No.: US 6,612,486 B2
(45) Date of Patent: Sep. 2, 2003

(54) SMART CARD MANAGING SYSTEM

(75) Inventors: Akiko Sato, Mitaka (JP); Yusuke Mishina, Kunitachi (JP); Minoru Ashizawa, Tokyo (JP); Yutaka Matsui, Kunitachi (JP); Yuusuke Shindou, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/081,538

(22) Filed: Feb. 25, 2002

(65) Prior Publication Data

US 2003/0111528 A1 Jun. 19, 2003

(30) Foreign Application Priority Data

Dec. 19, 2001 (JP) ......................................... 2001-385436

(51) Int. Cl.[7] ............................................... G06F 17/00
(52) U.S. Cl. ..................... 235/375; 235/380; 235/379; 235/382; 235/492; 380/255; 705/41
(58) Field of Search ................................. 235/375, 380, 235/379, 382, 492; 380/255; 705/41

(56) References Cited

U.S. PATENT DOCUMENTS 6,170,744 B1 * 1/2001 Lee et al. .................... 235/380
6,216,227 B1 * 4/2001 Goldstein et al. ........... 713/172
6,233,683 B1 * 5/2001 Chan et al. .................. 713/172
6,240,512 B1 * 5/2001 Fang et al. .................. 713/150
6,275,824 B1 * 8/2001 O'Flaherty et al. ............ 707/9
6,351,819 B1 * 2/2002 Berglund et al. ............ 713/310

* cited by examiner

*Primary Examiner*—Diane I. Lee
*Assistant Examiner*—Allyson Sanders
(74) *Attorney, Agent, or Firm*—Antonelli, Terry, Stout & Kraus, LLP

(57) ABSTRACT

In the case where a card issuer and a service provider are different in operating and managing a smart card for multi-application programs, when the card issuer sends a request of sending an initial load application program personalized when initially issuing the card to the service provider, the service provider can not select a proper application program and determine an object for personalizing. This is solved by assigning a unique number to the smart card issue application form for cooperating the card issuer with the service provider.

20 Claims, 12 Drawing Sheets

FIG.11

| HEADER | APPLY CODE LIST={100001,100008,···} |
|---|---|

FIG.12

| HEADER | KEY ID | PERSONALIZED INITIAL AP LIST | | | | |
|---|---|---|---|---|---|---|
| | | APPLY CODE=100001 | ENCRYPTED DATA | APPLY CODE=100008 | ENCRYPTED DATA | ··· |

FIG.13

| # | APPLY CODE | ISSUANCE DATA | CARD ID |
|---|---|---|---|
| 1 | 100001 | NAME=TARO YAMADA, AGE=21 | (NUMBERING AFTER ISSUANCE) |
| 2 | 100018 | NAME=HANAKO SUZUKI, AGE=39 | (NUMBERING AFTER ISSUANCE) |
| ··· | ··· | ··· | ··· |

FIG.14

| # | APPLY CODE | INITIAL AP DATA |
|---|---|---|
| 1 | 100001 | NAME=TARO YAMADA, PIN=1111, |
| 2 | 100018 | NAME=HANAKO SUZUKI, PIN=9999, |
| ··· | ··· | ··· |

FIG.15
TYPE 1
TYPE 2
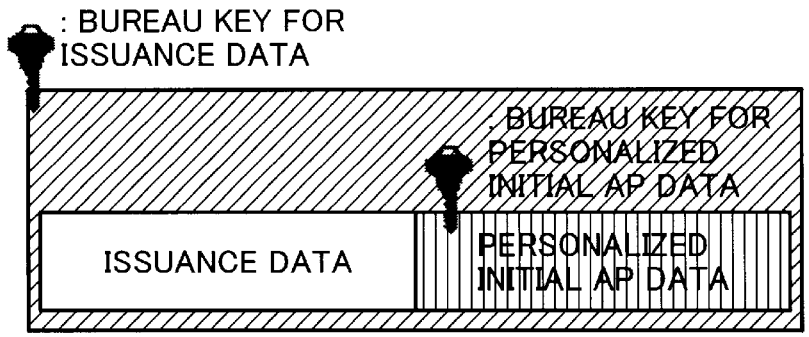

SMART CARD MANAGING SYSTEM

BACKGROUND OF THE INVENTION

The present invention relates to a smart card managing system. More particularly, the invention relates to a managing method and an issuance processing method of card initializing information to be used in issuing a smart card (hereinafter sometimes referred to as "multi-application smart card") on which a plurality of application programs can be dynamically loaded or removed and application information to be loaded on the smart card when it is issued, and in particular, to a managing method of application personalizing information based on an applicant (user) for a card.

As has been discussed in Technical Report of IEICE (The Institute of Electronics, Information and Communication Engineers), Vol, 100, No. 541, Knowledge-Based Software, KBSE2000-54 to 65 (Jan. 11, 2001), pages 25 to 32, conventionally, the managing system architecture for issuing and operating a multi-application smart card may be configured so flexibly as to match various business forms if it adopts such a system model as having a card issuer (often abbreviated as CI) and a service provider (often abbreviated as SP) separated from each other.

Concretely, a service provider who provides the service through the use of a card application may be an independent managing entity of a card issuer, based on the characteristic of the multi-application smart card, that is, the characteristic where a plurality of applications may be loaded on a single smart card. Under this managing entity model, the card issuer takes responsibility of an operation and management service on a smart card, owns a smart card issuance managing system of executing the service, and then operates the system. On the other hand, the service provider takes responsibility of an operation and management of the applications, owns an application managing system of executing the service, and operates the system. In executing the actual smart card operating and managing service, both of the systems are cooperated with each other for processing the service.

SUMMARY OF THE INVENTION

The foregoing prior art involves the problem that no sufficient considerations are given to the card issuance service, a typical operating and managing service involved in smart cards, such as the content of a service to be executed by the card issuer and the service provider through the use of their own card issuance managing system and application managing system, the cooperating method of the operating and managing processes to be executed by the two managing systems, the protecting method of the information owned by each managing entity, and so forth. Hereafter, this problem will be discussed in detail.

FIG. 1 illustrates a configuration of a conventional smart card system through the use of several entities such as a smart card issuer, a service provider for a smart card, a smart card issuance bureau (often abbreviated as a bureau), and a smart cart as well as a data flow in a card issuing service.

At first, the summary of a component of the system will be discussed below.

A numeral 101 denotes a smart card issuance managing system. A numeral 104 denotes an application managing system. A numeral 107 denotes a smart card issuance bureau system (often abbreviated as a bureau system). The "smart card issuer" is a managing entity who runs a service of issuing and managing a smart card through the use of the smart card issuance managing system 101. The "smart card issuer" also takes responsibility of a smart card. The smart card issuance managing system includes a database 103 related to smart card and a smart card issuing unit 102 as minimum components. The smart card issuer holds smart card management information in the database 103 related to smart card, and, based on data in the database, issues a smart card and delivers it to a user 111. The smart card management information includes application information given from a user and basic information required for issuing a smart card.

The "service provider" is a managing entity who runs a service of issuing and managing an application to be loaded on the smart card through the use of an application managing system 104. The service provider loads an application on the smart card. The smart card load application may be created by the application managing system or may be obtained or purchased from a third-party system called an application developer 112. The application managing system includes a database 106 related to application and an application load processing unit 105 as minimum components. The database 106 related to application stores application data.

The "bureau" is a managing entity who runs a deputizing agency business of issuing a smart card through the use of the bureau managing system 107. The bureau acts for a smart card issuer in response to the request from the smart card issuer when issuing a massive amount of smart cards, for example. The bureau managing system 107 holds a smart card issuance system 108 for issuing a massive amount of smart cards. The smart card issuance system 108 may have a HSM (Hardware Security Module) built therein. The HSM is an information processing apparatus that encrypts or decrypts data to be inputted to the HSM itself through the use of a key held therein. This HSM is characterized by disability to access from the outside of the HSM to the internal information and the internal process of the HSM itself.

The smart card issuance managing system, the application managing system, and the bureau managing system realize transfer of information through a network 113, delivery of an information recording medium like a floppy disk by mail or by hand delivery or delivery of a form by mail or by hand delivery among those systems.

Further, the above-described smart card issuance managing system 101 of the card issuer and the application managing system 104 of the service provider include an issuing function of a smart card, a smart card issuance deputizing request processing function, and a personalizing function of an application (to be discussed below) in the processing units 102 and 105, respectively. Each processing function is realized as a computer program and is operated.

In turn, the description will be oriented to the problem of the conventional system by referring to the operating routine of the smart card issuing service in the foregoing system as an example.

In advance of a receipt of an issue application 121 from a user 111, the smart card issuance managing system 101 and the bureau managing system 107 operate to exchange a bureau key 109 served as a key for the purpose of protecting the card issuance information to be transferred between the card issuer and the card provider. The use of this key makes it possible to guarantee that the card issuance information created by the card issuer is hidden from another managing entity including the bureau and is entered into the smart card issuance system 108 without being interpolated or altered.

At first, the user 111 files an application of issuing a smart card to the smart card issuer (process 121). The user 111 enters requisite matters in an application form 114 for card issuer and an application form 115 for service provider, the form 115 being for an application to be intended to be loaded initially when the smart card is issued. The former application form is sent to the smart card issuer (process 122), while the latter is sent to the service provider (process 123). The matters to be entered on the applications include a user name and a password (PIN) to be set to the card or the application and personal information like an annual income. It is to be noted that the personal information items to be described on the application forms may be different according to each of the application forms. It means that one form for an application needs the name and the birth date of the user, while another form for an application needs the name and the password of the user. Further, it is to be noted that the personal information to be required to be described by a certain managing entity is basically not allowed to be disclosed to another managing entity from a viewpoint of security and privacy protection. Hence, the submitted application forms are independently stored in the systems. Concretely, the application form for card issuer is stored in the smart card issuance managing system, while the application form for service provider is stored in the application managing system.

Then, the smart card issuance managing system makes request for personalizing and sending an application to be loaded when issuing the card at an initial time (called an initial load application) to the application managing system (process 125). The personalizing process of the application means a process of setting the personal information for each user such as the name and the PIN of the user to the application.

Herein, the first problem involved in the conventional system is the fact that the application managing system that accepts the request of sending the personalized initial load application is unable to determine which of the applications should be selected and for which of the users the selected application is to be personalized. This problem results from the fact that the smart card issuer and the service provider are independent managing entities and when each managing entity stores the corresponding application information, the two systems can not cooperate with each other since there is no link information between the application information.

Hereafter, in order to address the second problem involved in the conventional system, the description will be expanded on the assumption that the initial load application and its object for personalizing can be specified or identified.

The application managing system operates to personalize the specified application on the application information of the object for personalizing and then send it to the application managing system as the personalized application (process 126).

Herein, as the second problem involved in the conventional system, it is possible to refer to the fact that the service provider cannot hide the content of the data of the personalized application from the card issuer. This results from the fact that no independent secret key information exists between the service provider and the bureau.

This is the end of the description of the two problems involved in the conventional system.

The remaining matters of the card issuing process in the conventional system will be briefly described. The smart card issuance managing system operates to encrypt the accepted data, that is, the personalized application data and the card issuance information required for issuing the card through the use of the bureau key having been exchanged with the bureau system and then to send it to the bureau system (process 128). The bureau system operates to enter the accepted data in the smart card issuance system. The smart card issuance system encrypts the data through the use of the bureau key held therein and then sends it to the smart card. This process completes the smart card issuing process 129 and the initial application loading process 130.

If the smart card issuance system includes the foregoing HSM built therein, the data sent through the pass denoted by 128 is decrypted only inside of the smart card issuance system itself, so that it may be hidden from the outside of the card issuance system like an operator of the bureau.

In order to solve the foregoing problems, it is an object of the present invention to provide a smart card issuance managing method and system which are allowed to cooperate a card issuer with a service provider through link information between the application informations owned by the card issuer and the service provider and to encrypt personalizing application data to be sent from the service provider to the card issuer.

Hereafter, the invention will be described in detail.

An embodiment of the invention solves the first problem, that is, the problem that no link information exists between the application information owned by the card issuer and the service provider respectively by adding a unique number to the smart card issue application filed by a user. When filing an application of issuing a smart card, the user describes the smart card issue application information that is requisite matters to issuing the smart card before submitting it. The smart card issue application information includes a name, a phone number, and an age of the user, and so forth. Likewise, the user describes the requisite application information of an initial load application in issuing the smart card before submitting it. The requisite application information, of the initial load application includes a user name that is common to that included in the smart card issue application information, PIN information for an application that is unique to the initial load application, and so forth. Further, two or more initial load applications may involve, not limited to one, so that a plurality of application information of the initial load applications may be filed. When the user files these smart card issue applications using these application information, apply codes are added to these application informations. The application managing system manages the smart cart issue application informations with the apply codes as the key information. The application load processing system manages the application informations for the initial load applications with the apply codes as the key information. This management allows the smart card issuance to be executed as cooperating the data of both of the systems with each other.

The smart card issuing process of the smart card issuance managing system with the apply codes will now be concretely described. The smart card issuance managing system receives the smart card issue application from the user and thereby accepts the smart card issuance application informations. The smart card issuance managing system adds the apply codes to the smart card issuance application informations and then store the application informations in the database related to application owned by the managing system itself with the apply codes as the key. Further, the smart card issuance managing system operates to send the application informations for the initial load applications in association with the added corresponding apply codes to the application managing system. As a sending means, when the application form is written on paper, it is mailed or when it is written as electronic data, it is sent as the electronic data. The destination application managing system is a system that manages the operation and management of the initial load applications. The applications to be initially loaded on the smart card to be issued may be already defined, so that no selection of these applications by the user be possible or they may be freely selected, depending on the policy of the smart card issuer.

In addition, as the apply code, "peculiar sign" or "correspondence peculiarity sign" are available, for example.

The "sign" means "a code that is created on a certain system for representing an object". For example, it may be a combination of only the figures, one of the serial numbers, or a combination of characters, figures and symbols.

The "peculiar sign" means a sign that is uniquely created for identifying one object from another. For example, one (106, for example) of the apply codes with the serial numbers (1, 2, 3, . . . for example) added corresponds to the "peculiar sign". The serial numbers are included in the sign.

The "correspondence peculiarity sign" means the corresponding sign to the "peculiar sign". For example, the "correspondence peculiarity sign" has one to one correspondence with the peculiar sign. For example, when the peculiar sign is "Merry01ab", the correspondence peculiarity sign that has one to one correspondence with that peculiar sign is "1258". The correspondence peculiarity sign is used, for example, in the case that the database stores only the limited signs (for example, only a combination of figures). The peculiar sign has no such limitations.

The signs to be stored in the database or the like may be numbered on another rule than that of the peculiar signs (for example, a combination of only figures).

Then, the description will be oriented to the smart card issuing process. The initial load applications are required to be personalized. Since the personalizing information of the application is held in the application managing system, the smart card issuance managing system requests the application managing system that personalization be made. In order to distinguish an object for personalizing from another, the card ID may be used after the smart card is issued. At this time, however, the card is not issued yet. Hence, the numbered apply codes are specified. Then, the smart card issuance managing system receives the personalized application sent from the application managing system in response to the specified personalizing request.

Likewise, the concrete description will be oriented to the smart card issuing process included in the application managing system using the apply codes. The application managing system stores application accepting information which corresponds to application filing information in the database related to application. Then, the smart card issuance managing system requests the application managing system to personalize the application to be initially loaded in issuing the smart card. The application managing system retrieves the database with the specified apply codes as the key, personalize the application by using the concerned data, and send the personalized application to the card issuer.

The method of numbering the apply codes may be dynamically executed by the smart card issuance managing system when the user files an application of issuing the smart card. Alternatively, a numbering organization may assign the allocated number to the apply codes in advance. In a case where numbers described commonly on the smart card issue application form and the application form for an application are used as the apply codes, these numbers are stored in each database in association with corresponding application informations. This allows these numbers to be used as the apply codes in the system. That is, the card issuer stores apply codes described on the application form and corresponding smart card issuance information described on the application form in association with each other and in the database related to smart card, so as to be used in the subsequent smart card issuance management. Likewise, the service provider associates apply codes described on the application form with corresponding application information for an application and then store the apply codes and the corresponding application information in the database related to application, so as to be used for the subsequent smart card management.

Further, in the case of dynamically numbering the apply codes, the correspondence of the numbers described on the application form with the apply codes is stored in each database so that the correspondence between the apply codes and the application informations may be made possible. That is, the card issuer stores numbered apply codes, corresponding numbers described on the application form and corresponding smart card issuance application information in association with each other in the database related to smart card. The correspondence is notified to the service provider so that the data cooperation between both of the systems may be realized. The service provider associates apply codes with corresponding application information for an application according to the notified correspondence between the apply codes and the numbers described on the application form and stores them in the database related to application. Those information are used for the subsequent smart card management.

The application form, termed herein, may be paper or an electronic medium to be entered from the Web screen. In either case, the present invention provides, as the solving method for the first problem, the method of assigning the apply codes collectively to the application form for smart card issuance and the application form for an initial load application with respect to the smart card issue application and cooperating the data of the smart card issuance managing system with the data of the application managing system as link information.

Then, an embodiment of the invention provides the solving method for the second problem that the service provider cannot hide the data of the personalized application from the card issuer. This solving method is executed by exchanging a key between the bureau and the service provider in advance and encrypting the personalized application data with the key. As mentioned above, the second problem results from the fact that no independent key information exists between the service provider and the bureau. Hence, before issuing the smart card, the key is exchanged between the service provider and the bureau that acts for the smart card issuer in advance and the data is encrypted with this key. This allows the privacy of the data to be kept from the outside of the manager including the card issuer except the bureau.

The number of the keys to be exchanged may be one or more. In a case where one common key to the bureau and the service provider does not satisfy the security requirement, a plurality of keys are exchanged and then the encrypted data with the indexes for indicating the encrypted keys is sent to the bureau in which the data is allowed to be decrypted. Further, the exchanged key is specified as a master key from which a derivation key is created with the random number each time the data is encrypted. After the data is encrypted with this derivation key, the encrypted data with the random number used for the derivation may be sent to the bureau. Of course, the combination of these two methods is made possible. That is, the derivation key created from one of the master keys is used for encrypting the data, and the encrypted data with the index for specifying the master key and the random number used for the derivation may be sent to the bureau.

In turn, the smart card issuing process included in the application managing system that uses the foregoing encrypting method will now be concretely described. The application managing system operates to exchange one or more keys with the bureau that acts for the smart card issuer. Then, when the card issuer requests to personalize the initial load application, the personalized application data is encrypted with the exchanged key. If necessary, the necessary information for specifying the key such as the foregoing index for keys and the random number is added to the encrypted data before sending the data to the card issuer.

Likewise, the smart card issuing process included in the smart card issuance managing system that uses the foregoing encryption will be described below. The smart card issuance managing system requests the service provider to personalize an application to be initially loaded on the smart card. The data given back as a response is encrypted and thus can not analyzed. The smart card issuance managing system sends the data with the information required for issuing the smart card to the bureau and request the bureau to act for the smart card issuer. In a case where the card issuer has exchanged the key with the bureau like the service provider, the card issuer encrypts the smart card issuance information with this key and then send the encrypted data into the bureau, the data given back as a response from the service provider. The encrypting method may be the method of adding the smart card issuance information to the encrypted data sent from the service provider and then encrypting the data with the key of the card issuer or the method of encrypting the smart card issuance information with the key of the card issuer and then adding the encrypted data to the encrypted application data. After the request of acting for the smart card issuer is given to the bureau, the card issuer accepts the issuing result from the bureau and then terminates the smart card issuing process.

Likewise, the smart card issuing process included in the bureau system that uses the foregoing encryption will now be described. The bureau system exchanges one or more keys with the service provider in advance. Then, in response to the request of acting for the smart card issuer given from the card issuer, the bureau enters the data into the smart card issuance system. The smart card issuance system has the key set therein, by which the data is decrypted with the key for the purpose of extracting the smart card issuance information and the personalized initial load application. The use of this information allows the smart card issuing process and the loading process of the initial load application to be executed and then the result to be sent to the card issuer. If the smart card issuance system includes the foregoing HSM built therein, the data of the request of acting for the smart card issuer sent from the card issuer is allowed to be decrypted only inside of the smart card issuance system. This makes it possible to guarantee that the data is hidden from the outside of the card issuance system such as an operator of the bureau.

As set forth above, the present invention provides the solving method for the second problem in which the personal information of the application is hidden from the card issuer by encrypting the personalized initial load application data with the key which is exchanged between the bureau and the service provider.

The aforementioned smart card managing method provided by the invention makes it possible to provide link information between the application informations held by the card issuer and the service provider respectively so that the card issuer and the service provider can cooperate with each other and privacy of the personalized application data sent from the service provider to the card issuer can be secured.

Other objects, features and advantages of the invention will become apparent from the following description of the embodiments of the invention taken in conjunction with the accompanying drawings.

BRIEF DESCRIPTION OF THE DRAWINGS

FIG. 11 is a view showing an example of a communication message of a request for personalizing the initial load application transmitted by the card issuer to the service provider;

FIG. 12 is a view showing an example of a communication message of a response for personalizing the initial load application transmitted by the service provider to the card issuer;

FIG. 13 is a view showing an example of a data table included in a database related to smart card included in the smart card issuance managing system;

FIG. 14 is a view showing an example of a data table included in a database related to application included in the application managing system; and FIG. 15 is a view showing an example of an encrypting pattern included in a message of requesting to act for a card issuer, transmitted by the card issuer to the bureau.

DESCRIPTION OF THE EMBODIMENTS

Figure 1:
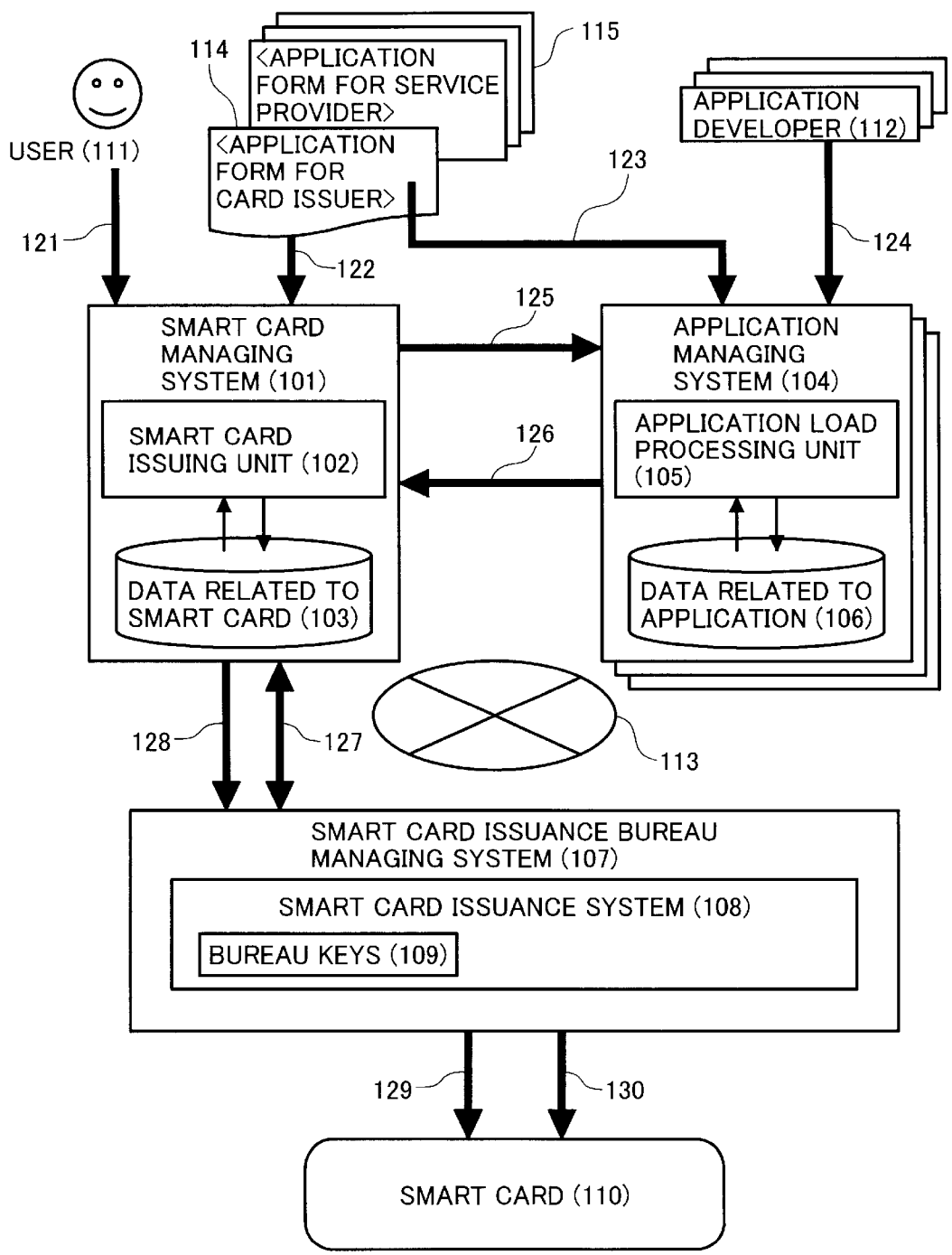
FIG. 1 is a diagram showing the configuration of a conventional smart card system.
Figure 2:
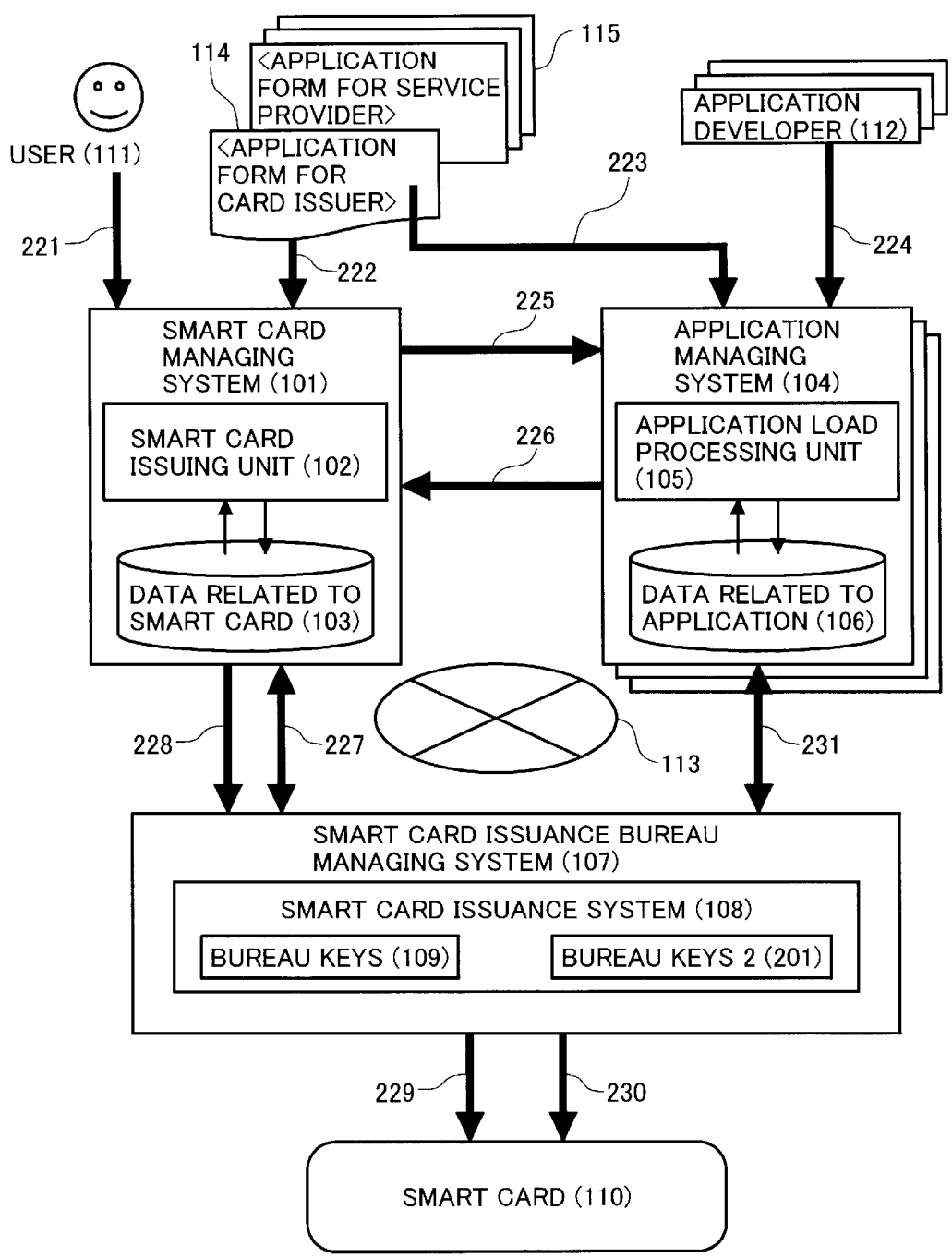
FIG. 2 is a diagram showing the configuration of a card system for executing a method of issuing a smart card having an initial load application according to an embodiment of the present invention.

Hereafter, the embodiment of the invention will be described with reference to the appended drawings. The basic configuration of the system according to the present invention is illustrated in FIG. 2. FIG. 2 exemplarily illustrates a relationship among a smart card issuer, a service provider, a smart card issuance bureau (abbreviated as a bureau), and a smart card. A numeral 101 denotes a smart card issuance managing system. A numeral 104 denotes an application managing system. A numeral 107 denotes a smart card issuance bureau managing system (abbreviated as a bureau system). The configuration and the role of each system are as described above.

The smart card issuance managing system, the application managing system and the bureau system are basically connected through a network 113. The transfer of the information is realized by sending and receiving a wire message on line. However, the transfer may be executed by mailing or hand-delivering an information recording medium such as a floppy disk or mailing or hand-delivering an application form written on paper.

In the configuration according to this embodiment of the invention, each of the processing units 102 and 105 provided in the smart card issuance managing system 101 of the card issuer and the application managing system 104 of the service provider includes a smart card issuing function, a smart card issuance deputizing requesting function, and an application personalizing function to be discussed later. Each of these functions is executed according to a computer program.

In turn, the description will be oriented to the rough procedure of issuing a smart card by the method proposed by the embodiment of the invention. Though the process of issuing the smart card is started by the issuing application 221 given by the user 111, two pre-processes are placed. The first pre-process, as indicated by a numeral 227, is to exchange a bureau key 109 served as a card issuance information key between the smart card issuance managing system and the bureau system. The second pre-process, as indicated by a numeral 231, is to exchange a bureau key 2 (201) served as a personalized initial load application program key between the application managing system and the bureau system.

The normal termination of the foregoing two pre-processes makes it possible to execute the process of issuing the smart card. At first, the user 111 files an application of issuing the smart card to the smart card issuer (221). The user describes the requisite matters on the smart card issuance application form 114 and the application form 115 for an application to be initially loaded in issuing the smart card and submits them to the smart card issuer (222). The smart card issuer sends the application form for the initial load application of the accepted forms to corresponding service provider (223). The matters to be described on the smart card issuance application form include a name, an address, and a phone of the user, and so forth. The matters to be described on the application form for the initial load application include a name of the user, a password (PIN) required when executing the application, and so forth. These two forms have the same number added thereto, which number will be described as "apply code". They are used for distinguishing the applications given by the user from each other. The data of the card issuance application form and the data of the application form for an initial load application are separately managed in the smart card issuance managing system and the application managing system, respectively. The apply codes are served to link the data between these systems. Normally, after the smart card is issued to the user, the systems are linked through the card ID. Herein, however, since this is the process before issuing the card, no card ID is given until the card is issued. Hence, in place of the card ID, the apply code is served to manage the data between the two systems. This is one of the features provided by this embodiment of the invention.

Then, the smart card issuance managing system requests the application managing system to personalize the initial load application (225). The personalization of the application means that the individual information for each user such as the user name and the PIN is set to the initial load application. As a concrete method, the personal information may be directly written in the application program or a group of commands for personalization may be prepared in place of the application program. The embodiment of the invention may apply to both of the methods. Hereafter, the personalized application, termed herein, is provided by either of these methods. The application program and the personal information therefor are managed by the application managing system and may be specified by the apply codes. The smart card issuance managing system specifies the application program to be personalized through the apply code, and the application managing system personalizes the specified application program. Afterwards, the personalized application is encrypted by the bureau key 2 having been already exchanged with the bureau system and then is sent to the smart card issuance managing system (226). This allows the personalized application to hide its data content from the card issuer. The smart card issuance managing system encrypts the received personalized application data and the card issuance information required for issuing the smart card through the bureau key having been already exchanged with the bureau system and then send the encrypted data to the bureau system (228). The bureau system enter the received encrypted data in the smart card issuance system. The smart card issuance system decrypts the data through the bureau key held therein and the bureau key 2 and then send the decrypted data to the smart card. This is the end of the process of issuing the smart card (229) and the process of loading the initial load application (230).

Herein, if the smart card issuance system includes the foregoing HSM, the data having been sent by the process 228 is decrypted inside of the smart card issuance system, so that it is hidden from the outside of the smart card issuance system such as a bureau operator. Further, in the foregoing description, the bureau key and the bureau key 2 are used for encryption and decryption as they are. Alternatively, these keys may be used in another process. For example;

(1) the process of exchanging two or more keys in advance, using one of these keys for encryption, and adding the key ID for specifying the key used for encryption to the encrypted data, and (2) the process of deriving a key with a certain number as a key, encrypting the data with the derivation key, and adding the number used as the derivation key to the encrypted data.

Figure 3:
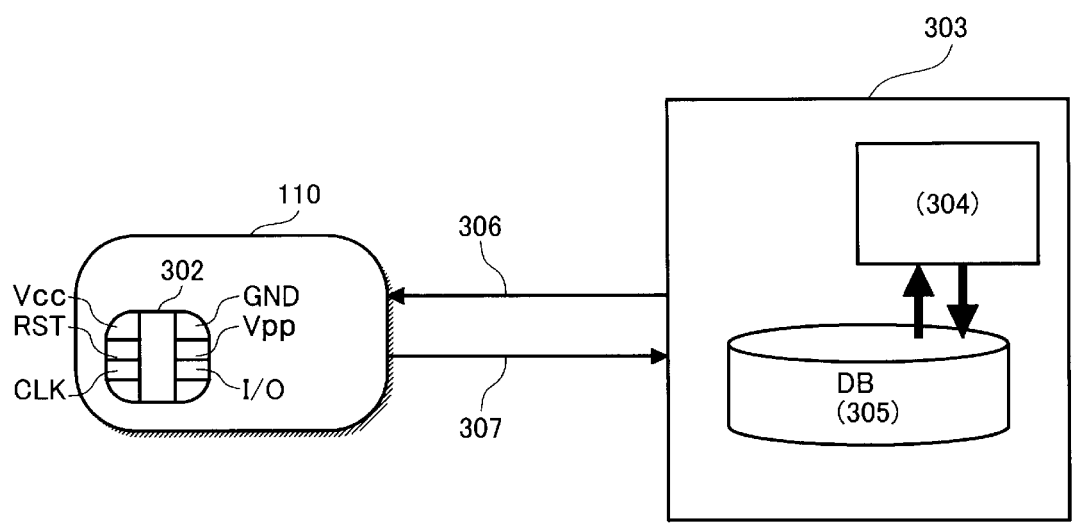
FIG. 3 is a diagram showing a summary of a card system.

FIG. 3 shows an exemplary summary of the smart card system. The smart card 110 includes a chip 302 and transfers data with a reader/writer (or a terminal provided with a reader/writer) 303. The reader/writer includes a control processor 304 and a magnetic disk 305 served as a database. The smart card 110, as usual, includes a Vcc (Supply Power), a GND (Ground), a RST (Reset), an I/O (Input/Output), and a CLK (Clock) terminals. Further, an arrow line denoted by 306 indicates various inquiries about a card ID and the like to be given from the read/writer 303 to the smart card 110. An arrow line denoted by 307 indicates a reply to the inquiry to be given from the smart card to the read/writer. The conventional system will suffice for this type of information conveyance.

On the IC chip included in the smart card, concretely, the foregoing application program is loaded on a memory area. In general, the memory may be a RAM (Random Access Memory), an EEPROM (Electrical Erasable Programmable Read-only Memory) or a ROM (Read-only Memory).

Figure 4:
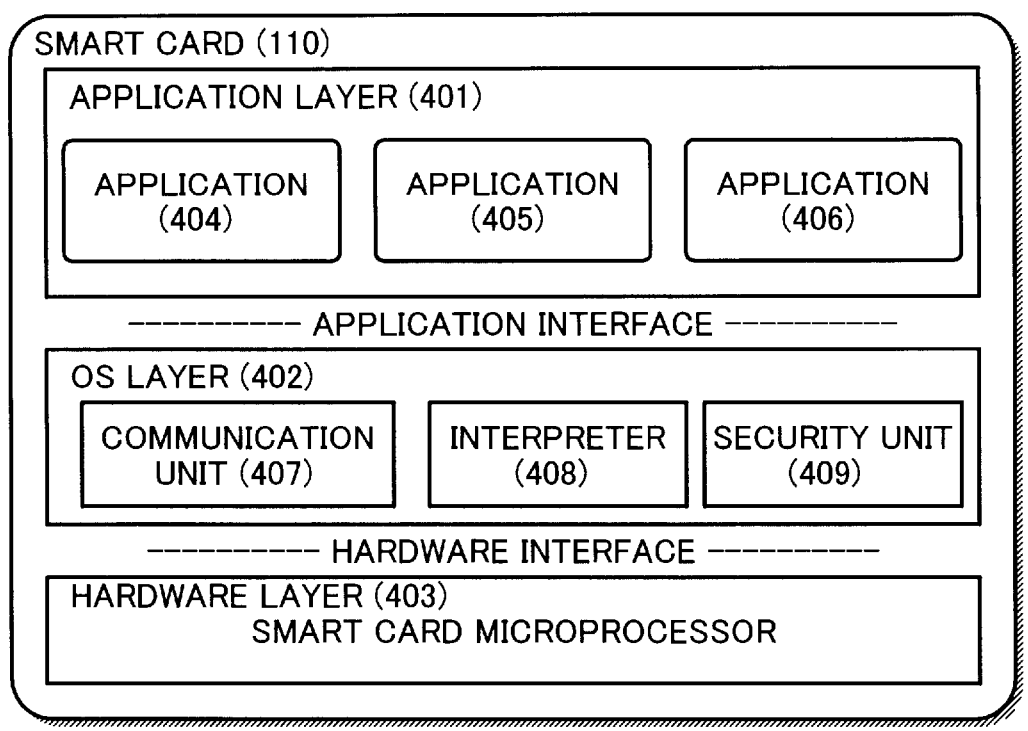
FIG. 4 is a diagram showing a basic composition of a smart card.

In turn, FIG. 4 illustrates a logical configuration of a basic area inside of the IC loaded in this type of smart card 110. Like ordinary microcomputers, this IC includes a hardware layer 403, an OS layer 402 on which an OS is loaded, and an application layer 401 on which an application is loaded. The "multi-application loadable" termed herein means that two or more applications 404 to 406 may be loaded on the application layer 401. Further, the "application initial load" means that these applications 404 to 406 being pre-loaded on the smart card are distributed to the user when the smart card is issued. The "dynamically loadable" termed herein means that one or more of the applications 404 to 406 may be loaded or deleted after the smart card is issued. The OS layer 402 includes a communication processing unit 407, an interpreter 408, a security mechanism 409, and so forth and operates to receive a command from the outside terminal or transfer a command of the application. Apparently, between the application layer 401 and the OS layer 402 is installed an application interface and between the OS layer 402 and the hardware layer 403 is installed a hardware interface.

Figure 5:
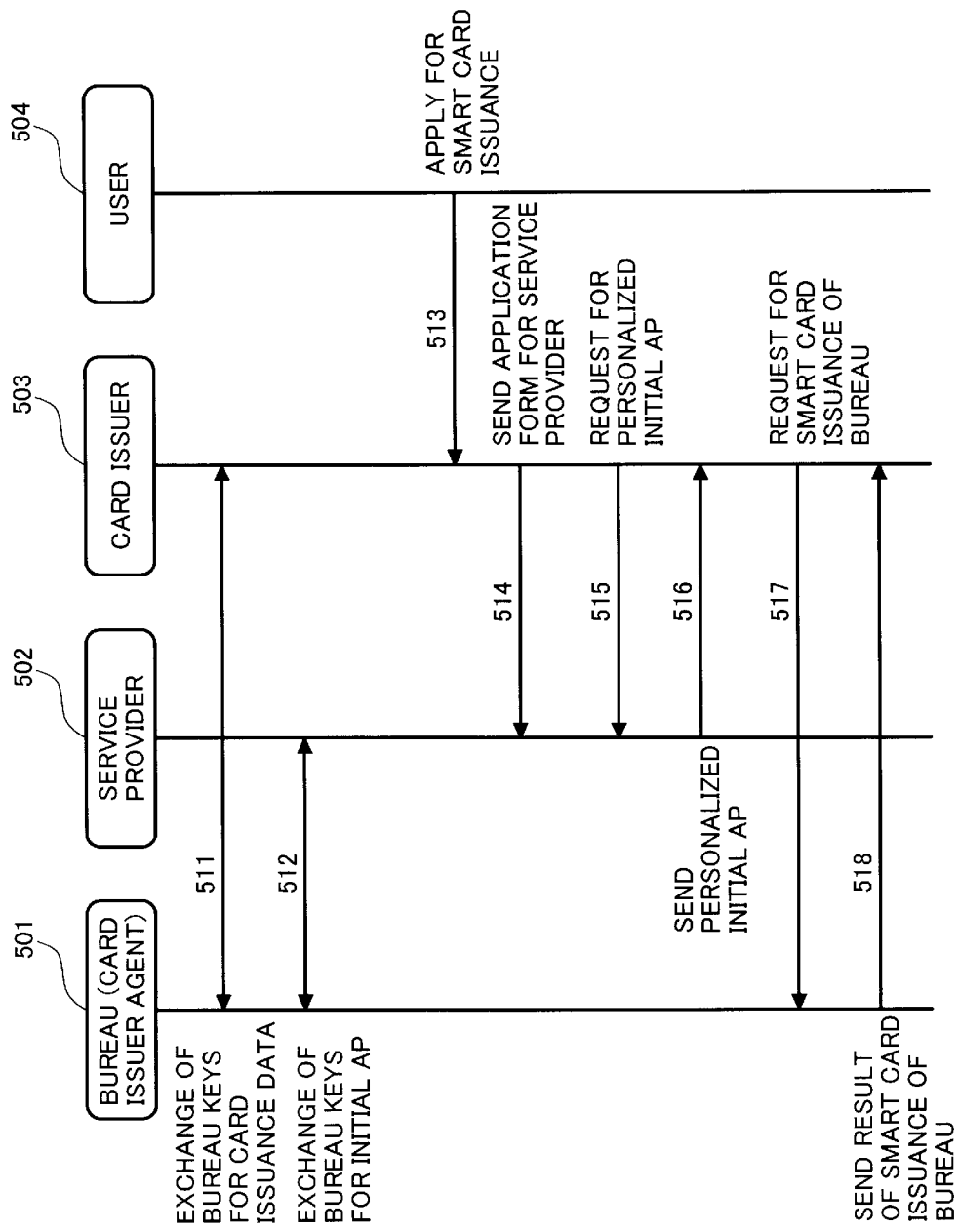
FIG. 5 is a view showing an overall sequence of personalizing the initial load application and issuing the smart card according to the present invention.

In turn, the description will be oriented to the concrete method of issuing a smart card on which the application is initially loaded. At first, the process of personalizing the initial load application and the process of acting for the smart card issuer will be described with reference to the sequence of FIG. 5. At first, between the bureau 501 and the card issuer 503 is exchanged a bureau key for the smart card issuance bureau (step 511). Likewise, between the bureau 501 and the service provider 502 is exchanged a bureau key for the initial load application (step 512). Either one of these two processes may be executed first rather than the reverse order. Before the following process of issuing the smart card, it is necessary that exchange of these keys has been completed. The issuance of the smart card is started when the user 504 files a new application of issuing a smart card (step 513). The card issuer sends the application form for the initial load application for the service provider to the service provider (step 514). Further, the card issuer requests the service provider to personalize the initial load application (step 515). In order to distinguish the application personalized by the personal information of one user from another, the apply code described on the application form is specified. The service provider personalizes the initial load application specified by the apply code, encrypts the personalized application through the key exchanged in step 512, and then sends the encrypted application to the card issuer (step 516). The card issuer adds the personalized initial load application to the information required for issuing the smart card, encrypts the result through the key exchanged in step 511, and sends the encrypted data to the bureau for requesting to act for a card issuer (step 517). The bureau operates to act for a smart card issuer according to the request and then send the result to the card issuer. This is the end of the process of issuing the smart card.

The details of the method of issuing the smart card according to the foregoing embodiment of the invention will be described with reference to the operating flowcharts (FIGS. 6 to 10) of the card issuer, the service provider and the bureau for each player. These flowcharts show the sequence of FIG. 5 in more detail.

Figure 6:
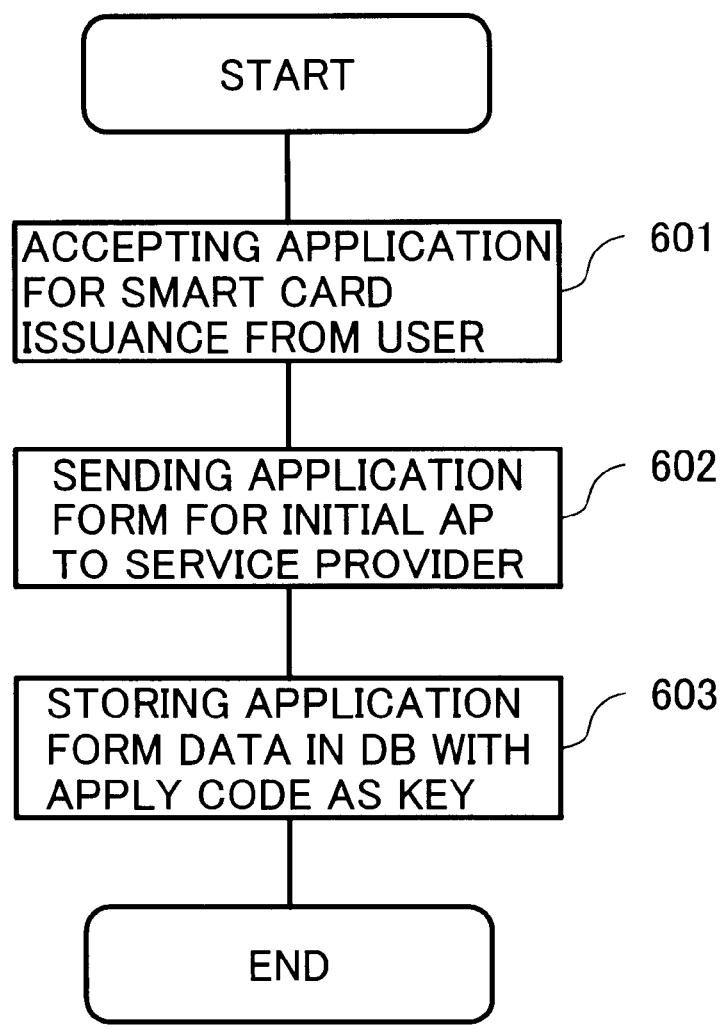
FIG. 6 is a flowchart showing a sequence in which a card issuer accepts a request of issuing a smart card from a user according to the present invention.
Figure 7:
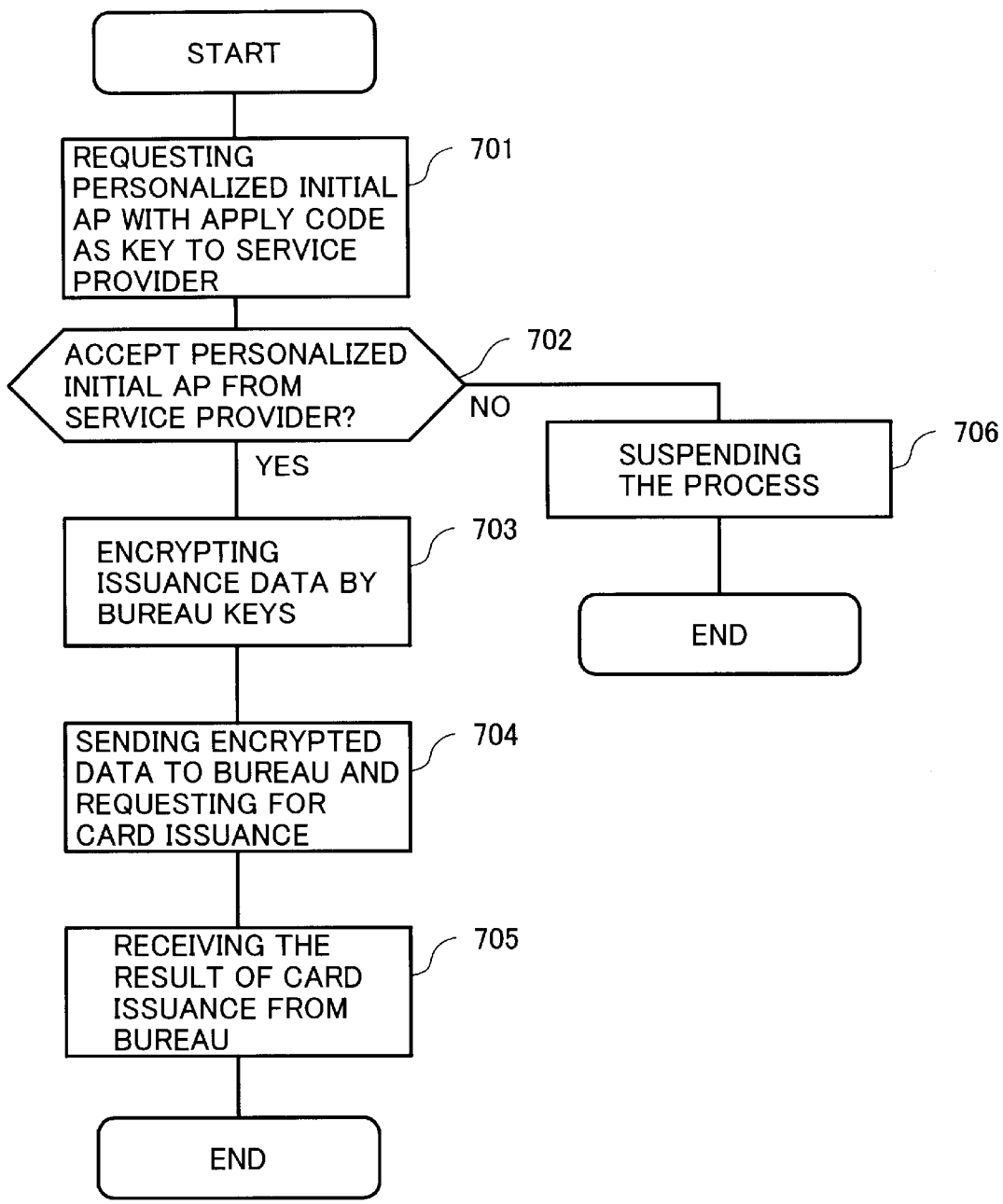
FIG. 7 is a flowchart showing a sequence in which a card issuer obtains a personalized application to be initially loaded from a service provider and requests a bureau to act for a card issuer according to the present invention.

FIGS. 6 and 7 are flowcharts showing the operation of the "card issuer" for issuing the smart card according to the embodiment of the invention.

At first, the process of accepting a smart card issue application from the user will be described with reference to FIG. 6. The card issuer accepts a new smart card issue application from the user (step 601). Concretely, the user submits the smart card issue application form which is filled in with requisite matters to the card issuer. The user also has to fill in the application form for the initial load application which has been initially loaded in the smart card when it is issued. The number of the initial load applications may be one or more. These application forms have the same apply code added thereto by the card issuer. These apply code is unique inside the smart card issuance managing system. The card issuer having accepted the application form operates to send the application form for the initial load application to the corresponding service provider (step 602). Further, the information written on the smart card issue application form is stored in the database related to smart card (step 603). FIG. 13 illustrates an example of the related data of the smart card issue application form stored in this database related to smart card. The information is stored with the apply code as the key. The information includes data required for issuing the smart card, such as a user name and a user age. At this time, since the card is not yet issued, the card ID is not determined. However, the card ID is stored based on the result of acting for the card issuer sent from the bureau after the card is issued.

In turn, the description will be oriented to how the card issuer requests the bureau to act for a card issuer with reference to FIG. 7. The card issuer requests the personalized initial load application from the service provider with the apply code as the key (step 701). Since the card is not yet issued and the card ID is not determined at this point, the smart card issuance managing system and the application managing system stores the data in their databases with the apply code as the key. Hence, by specifying the apply code, the card issuer can distinguish the data to be personalized from the other. FIG. 11 illustrates an example of a message of requesting the personalized initial load application sent by the card issuer to the service provider. The header portion stores the information required to transfer messages, such as managing entity information, date information and a communication number. The apply code of the data to be personalized is added to the header portion and then the resultant data is sent to the service provider. Of course, it is possible to request to personalize two or more pieces of data at a time, in which case the apply codes makes a list of the apply codes. Then, the card issuer receives the personalized application from the service provider (step 702). In a case where the process of personalizing the initial load application is not terminated properly by any reason such as disability to operate the system of the service provider, the process of initially loading the application is cancelled on the smart cart (step 706). In a case where the process of personalizing the initial load application is terminated properly, the smart card issuance information retrieved from the database related to smart card with the apply code as the key is encrypted with the bureau key for the card issuance information (step 703). Herein, several encrypting patterns may be possible. FIG. 15 illustrates an example of the encrypting patterns. As will be discussed below, the personalized initial load application received in step 702 has been encrypted with the key for the initial load application. Hence, the content of the encrypted application cannot be analyzed by the card issuer. The encrypting pattern 1 is a system of encrypting the card issuance information with the bureau key for the card issuance information apart from the encrypted personalized initial load application and adding the encrypted card issuance information to the encrypted personalized initial load application. The encrypting pattern 2 is a system of adding the card issuance information to the encrypted personalized initial load application and then encrypting the added result with the bureau key for the card issuance information. Both of the encrypting patterns 1 and 2 are feasible. The proper pattern is selected depending on the business policy of the card issuer and the specification of the smart card issuance system held by the bureau. The embodiment of this invention may apply to any one of these encrypting patterns. The data encrypted with the bureau key for the card issuance information is sent to the bureau for requesting to acting for a smart card issuer (step 704). After acting for the smart card issuer, the result of acting for the card issuer is received from the bureau (step 705). The result of acting for the card issuer includes the information as to if the process of acting for a card issuer is terminated properly, the correspondence between the issued smart card ID and the apply code, and so forth.

Figure 8:
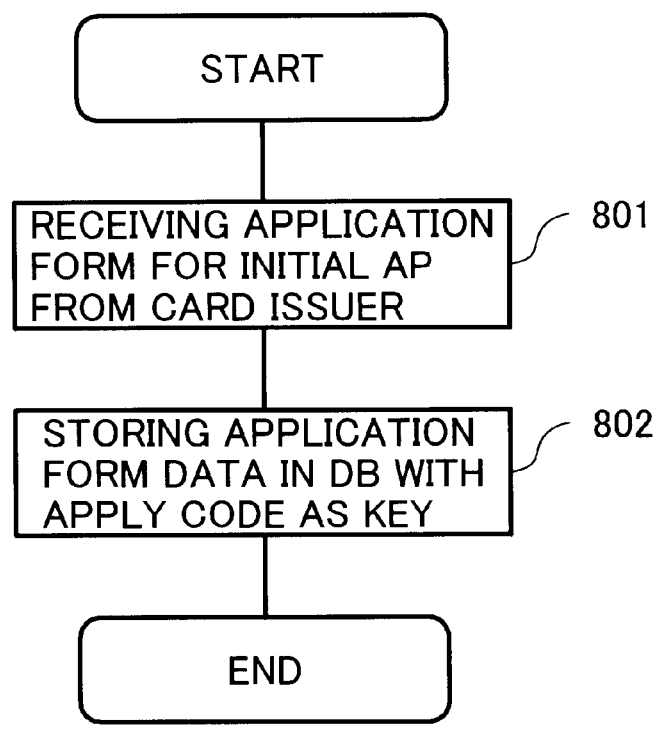
FIG. 8 is a flowchart showing a sequence in which a service provider accepts an application for an initial load application from a card issuer according to the present invention.
Figure 9:
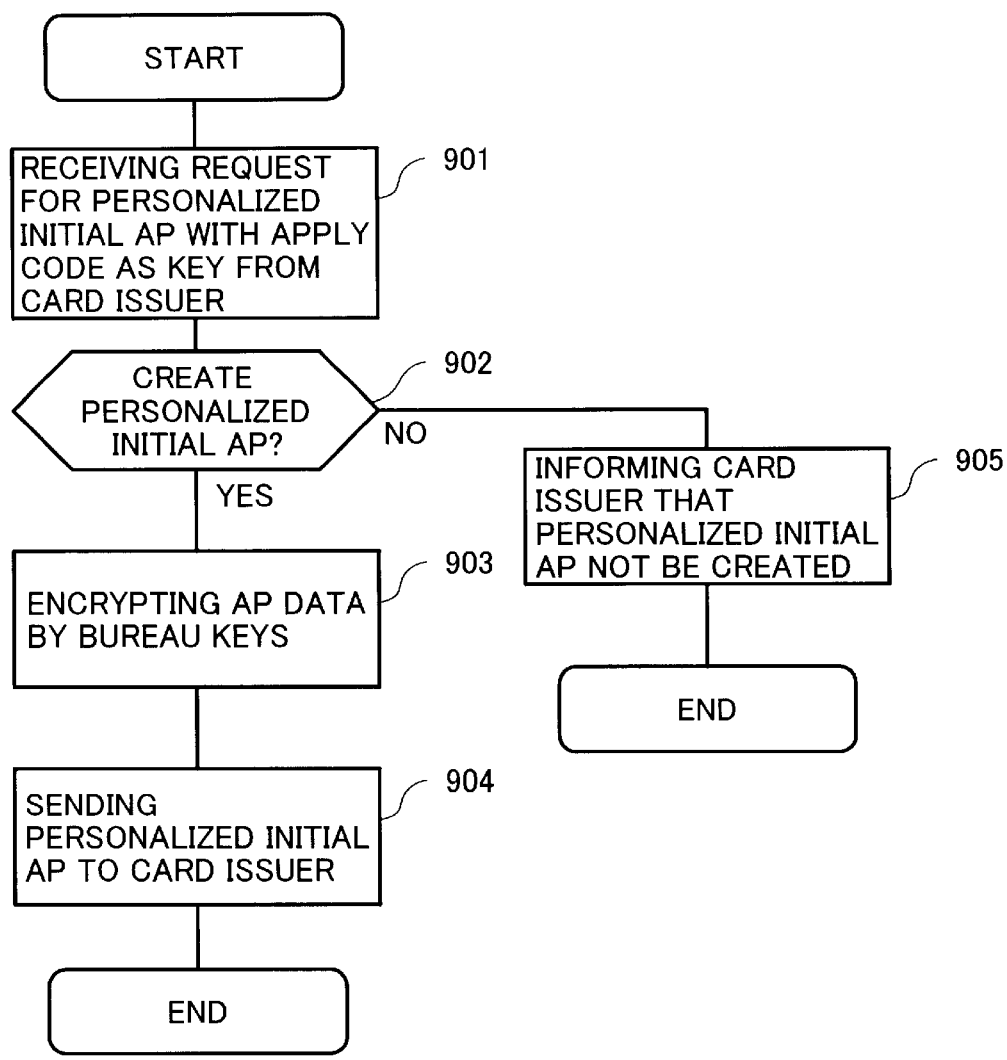
FIG. 9 is a flowchart showing a sequence in which a service provider personalizes the initial load application requested for the card issuer according to the present invention.

FIGS. 8 and 9 are flowcharts showing an operation in the "service provider" of personalizing the initial load application according to the present invention.

At first, the description will be oriented to the process of how the service provider accepts an application form for an initial load application from the card issuer (step 801). As mentioned above, the application form for the initial load application includes the apply code written thereon. As an example, there exists the common information to the smart card issuance information such as the user name and the user age or the information that is to be hidden from the outside of the application managing system, such as a password (PIN) for executing the application and a ceiling amount of use. At this time, the information to be hidden, written on the application form, is protected by pasting a seal on the concerned portion of the application form. The information written on the application forms is stored in the database related to smart card (step 802). FIG. 14 shows an example of the related data of the application form for the initial load application stored in the database related to smart card. The data is stored with the apply code as the key and includes the information required for loading and executing the application, such as the user name and the PIN.

In turn, the description will be oriented to the process of how the service provider personalizes the initial load application with reference to FIG. 9. The service provider receives a request of personalizing the initial load application from the card issuer (step 901). Then, the operation is executed to retrieve the data from the application managing system with the apply code written in the request message as the key and then personalize the data corresponding to the initial load application (step 902). In a case where the process of personalizing the initial load application is not terminated properly by any reason such as an imperfection of the related information of the application form for the initial load application, the process of personalizing the initial load application is cancelled or stopped (step 905). In a case where the process of personalizing the initial load application is terminated properly, the personalized initial load application is encrypted with the bureau key for the initial load application (step 903) and then is sent to the card issuer (step 904). FIG. 12 illustrates an example of a response message to the personalized initial load application sent by the service provider to the card issuer in step 904. Like the request message, the header portion includes the information required for transferring messages, such as managing entity information, data information and a communication number of the service provider and the card issuer. The key ID and the personalized initial load application are added to the header portion and then the added result is sent to the card issuer. The key ID is the data used for specifying a key if two or more keys are exchanged with the bureau in advance or if a key is derived. Further, since the personalized initial load application has been already encrypted, the application is stored in the corresponding form with the apply code for the purpose of corresponding the card issuer with the card issuance information. Of course, it is possible to respond to the request of personalizing two or more pieces of data at a time, in which case the personalized initial load applications are in the form of a list as illustrated in FIG. 12.

Figure 10:
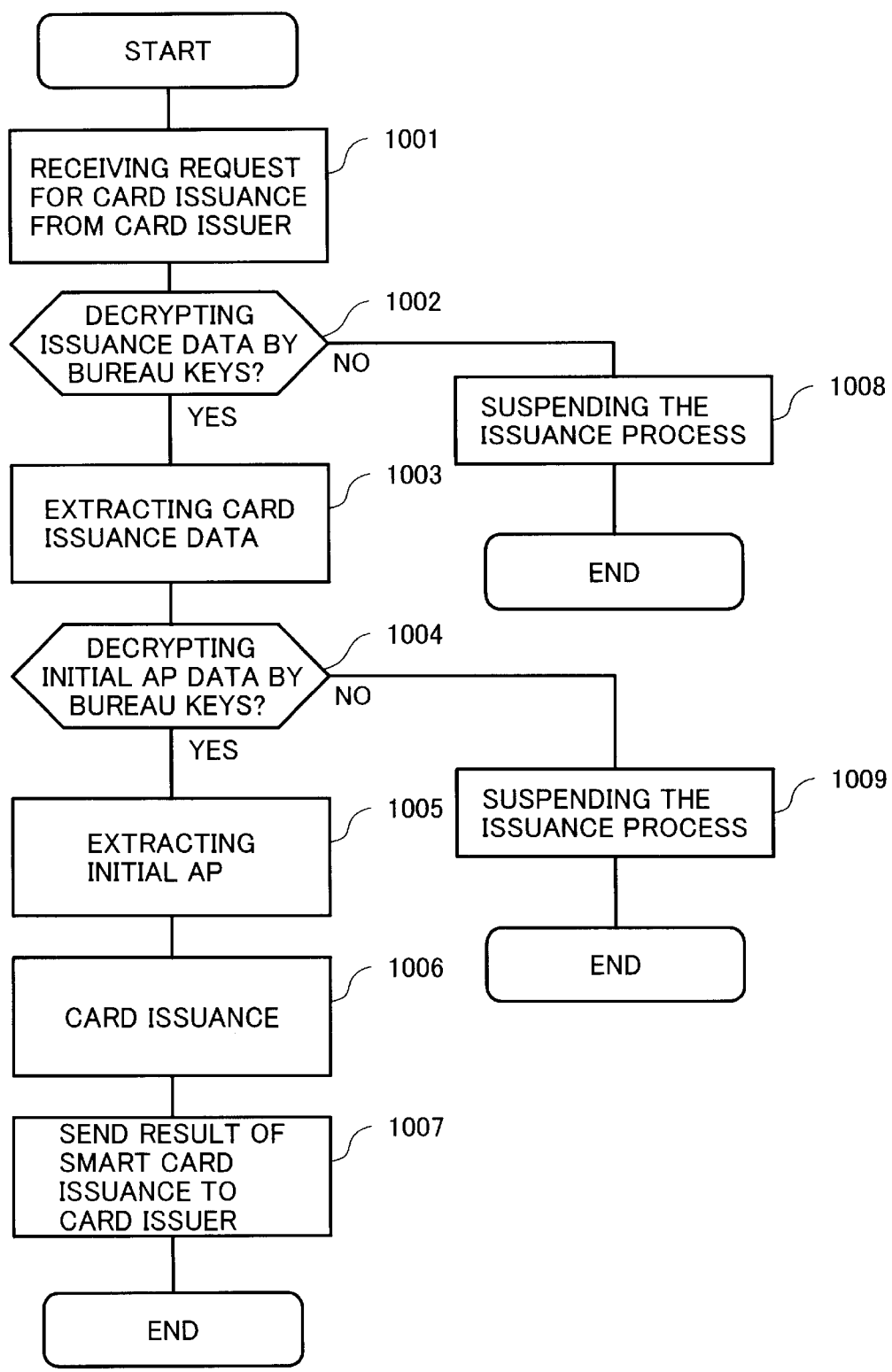
FIG. 10 is a flowchart showing a sequence in which a bureau acts for a card issuer as requested by the card issuer according to the present invention.

FIG. 10 is a flowchart showing an operation in the "bureau (that acts for a card issuer)" that performs a process of acting for a card issuer according to the embodiment of the present invention.

At first, the operation is executed to accept the request of acting for card issuance from the card issuer and the related data (step 1001). Then, the bureau enters the accepted data in the smart card issuance system. The received data is encrypted and the key for the encryption is stored in the smart card issuance system. If the issuance system includes the HSM, the key is disallowed to be extracted from the outside, in particular, even by the operator. Hence, the decryption is executed inside of the smart card issuance system. The following process is executed inside of the smart card issuance system. The issuance system operates to decrypt the data with the bureau key for card issuance (step 1002). In a case where two or more keys are exchanged or derived, the corresponding key is created based on the data for specifying the key and is used for decrypting the card issuance information. If the decryption is failed, the process of acting for card issuance is cancelled or stopped (step 1008). If it is successful, the card issuance information is extracted (step 1003). Then, the data is decrypted with the bureau key for the initial load application (step 1004). Like the bureau key for the card issuance information, two or more keys may be exchanged or derived. In this case, the corresponding keys are created based on the data for specifying the keys and then used for decrypting the personalized initial load application. If the decryption is failed, the process of acting for card issuance is cancelled or stopped (step 1009). If it is successful, the personalized initial load application is extracted (step 1005). Then, the process of issuing the smart card is executed with the decrypted card issuance information. Further, the process of loading the initial load application is executed by the decrypted personalized initial load application (step 1006). Lastly, the result of acting for card issuance is sent to the card issuer (step 1007). This is the end of the process of acting for the card issuer.

The aforementioned description has concerned with the embodiment of the invention. The smart card may be a contact-type one or a contactless one. The embodiment may apply to any type of smart card.

As set forth above, the embodiment of the present invention enables to execute the following operations.

(1) In response to the request of personalizing the initial load application at the time of issuing the smart card, sent from the card issuer to the service provider, the service provider enables to send the encrypted personalized initial load application data. The personalizing information of the application is the information required for loading and executing the application and should be hidden from any other person or entity rather than the user and the service provider who promotes the application. By encrypting the data with the key that is not held by the card issuer, the privacy of the data content is allowed to be protected from the card issuer.

(2) In a case that the smart card issuance system owned by the bureau includes the HSM, the privacy of the personalized initial load application described in the item (1) is allowed to be protected from the card issuer and the outside of the smart card issuance system. The personalized initial load application is allowed to be decrypted only with the key held inside of the smart card issuance system. If the smart card issuance system includes the HSM, the key is disallowed to be picked out of the system. Hence, even the operator in the bureau disables to decrypt the personalized initial load application.

(3) The number of the bureau key to be exchanged between the bureau and the card issuer and between the bureau and the service provider is not limited to one. Two or more keys may be exchanged. Alternatively, a derivation key may be created based on the exchanged key.

(4) According to the invention, when filing an application of issuing the smart card, the filing of an application only for the card issuer includes filing of an application for an initial load application. As indicated in the items (1), (2) and (3), the personalized application data is allowed to be encrypted. Further, by pasting a seal on the personalizing information of the application described on the application form by the user, the privacy of the personalizing information is allowed to be completely protected from the card issuer. It means that the user can file both an application of issuing a smart card and an application for an initial load application program to the card issuer at a time.

(5) The content data of the smart card issue application form is stored in the smart card issuance managing system, while the content data of the application form for the initial load application is stored in the application managing system. The link between both of the data may be established by the apply code. The apply code is a number added by the card issuer against the smart card issue application by the user. As an example, the apply code may be described commonly on the smart card issue application form and the application form for the initial load application. In filing a smart card issue application, the smart card is not yet issued. It means that the card ID normally served as a key when storing the data is not used to this point. The use of the apply code thus allows the link between both of the data to be executed until the card is issued.

(6) As described in the items (1), (2) and (3), in a case where the personalized initial load application sent by the service provider is encrypted, the card issuer disables to analyze the data. However, the addition of the apply code as an index by the service provider is allowed to associate the personalized initial load application with corresponding card issuance information owned by the card issuer.

The use of the peculiar sign makes it possible to cooperate the smart card issuance managing system when issuing the smart card with the application managing system.

By exchanging the key between the bureau and the service provider, the encryption of the personalized application is made possible, thereby allowing the content of the personalized application to be hidden from the card issuer.

It should be further understood by those skill in the art that the foregoing description has been made on embodiments of the invention and that various changes and modifications may be made in the invention without departing from the spirit of the invention and the scope of the appended claims.

What is claimed is:

1. A smart card managing system for a smart card on which two or more application programs are to be loaded, comprising:

a smart card issuance managing system and an application managing system provided independently of each other, wherein when a smart card user files a smart card issue application, a peculiar code is added to the application so that the peculiar code and a correspondence peculiarity sign corresponding therewith are stored in a database related to smart card included in said smart card issuance managing system and said database related to application included in said application managing system, respectively, and wherein said smart card issuance managing system, said peculiar code or said correspondence peculiarity code is made to be associated with corresponding data required for issuing the smart card to said user, and on said database related to application, said peculiar code or said correspondence peculiarity code is made to be associated with corresponding data required for loading an application program onto said smart card for said user.

2. A smart card managing system as described in claim 1, wherein said smart card issuance managing system and said application managing system communicate with each other through a network.

3. A smart card managing system as claimed in claim 1, wherein said issue application is executed by filling in an application form with requisite matters or entering requisite matters on a Web screen by the user, and when filing an application on said form, said peculiar code is added thereto or when filing an application on the Web screen, said peculiar code is added thereto.

4. A smart card managing system as claimed in claim 3, wherein said form includes a smart card issue application form and an application form for loading one or more application programs to be loaded on said smart card when issuing said smart card, said smart card issue application form and said load application form include said peculiar code common to each other, and said load application form is prepared one sheet for one application program or a set of sheets for a plurality of application programs.

5. A smart card managing system as claimed in claim 1, wherein when said smart card issuance managing system requests said application managing system to personalize an initial load application program, said peculiar code or said correspondence peculiarity code is conveyed to said application managing system, and said application managing system operates to specify object data for personalizing based on said peculiar sign or said correspondence peculiarity sign.

6. A smart card managing system as claimed in claim 5, wherein in response to the request for personalizing said application, said application managing system operates to convey a command for personalizing an application program to be initially loaded to said smart card issuance managing system or the personalized application program thereto.

7. A smart card managing system for a smart card on which two or more application programs are to be loaded, being executed by a process comprising the steps of:

transmitting a peculiar sign added in filing a smart card issue application or a correspondence peculiarity sign corresponding therewith to an object application managing system together with a request for personalizing an initial load application program; and specifying object data to be personalized in a database related to application, said object data being corresponded with the data required for loading an application program, against said application managing system having received one of said peculiar sign or said correspondence peculiarity sign and said personalizing request with said peculiar sign or said correspondence peculiarity sign as a key and receiving a command for personalizing said application program or said personalized application program based on said specified object data from said application managing system, wherein said application managing system has received said peculiar sign or said correspondence peculiarity sign in advance of said request and the object data for personalizing in said data related to application is made to correspond with either one of said peculiar sign or said correspondence peculiarity sign.

8. A smart card managing system as claimed in claim 7, wherein said smart card issuance managing system and said application managing system communicate with each other through a network.

9. A smart card managing system as claimed in claim 7, wherein said issue application is executed by filling in a form document with requisite matters or on a Web screen by the user, and said peculiar sign is added to said document or Web screen.

10. A smart card managing system as claimed in claim 9, wherein said form includes a smart card issue application form and an application form for one or more application programs to be loaded on said smart card when issuing said smart card, and said smart card issue application form and said load application form has said peculiar sign common to each other, said load application form is prepared one sheet for one application program or a set of sheets for two or more application programs.

11. An application managing system for a smart card where two or more application programs are to be loaded, being executed by a process comprising the steps of:

receiving a peculiar sign to be added in filing an application of issuing said smart card or a correspondence peculiarity sign corresponding therewith in advance, and corresponding object data for personalizing of an application program in a database related to application with either one of said peculiar sign and said correspondence peculiarity sign;

accepting a request of personalizing an initial load application program given from a smart card issuance managing system and said peculiar sign or said correspondence peculiarity sign corresponding to said personalizing request in said smart card issuance managing system; and specifying object data for personalizing in said database related to application with said peculiar sign or said correspondence peculiarity sign as a key, and supplying a command for personalizing said application program or said personalized application program to said smart card issuance managing system on the basis of said object data.

12. An application managing system as claimed in claim 11, wherein said smart card issuance managing system and said application managing system communicate with each other through a network.

13. An application managing system as claimed in claim 11, wherein the issue application of said smart card issuance managing system is executed by filling in a form document with requisite matters or a Web screen by a user, and said peculiar sign is added to said document or said peculiar sign is added when filing an application on said Web screen.

14. An application managing system as claimed in claim 13, wherein said document includes a smart card issue application form and an application form for one or more application programs to be initially loaded on said smart card when issuing said smart card, said smart card issue application form and said load application form have said peculiar sign common to each other, and said load application form is prepared one sheet for one application program or a set of sheets for two or more application programs.

15. A smart card issuing system for a smart cart where two or more application programs are to be loaded, comprising:

a smart card issuance managing system including a first database having data required for issuing said smart card;

an application managing system including a second database having data required for providing an application program load service onto said smart card;

a smart card issuance bureau managing system having means of issuing the smart card;

communicating means for connecting said smart card issuance managing system with said smart card issuance bureau managing system;

said application managing system and said smart card issuance bureau managing system having a first key common to each other; and wherein when said application managing system transmits to said smart card issuance managing system a command for personalizing an application program or the personalized application program in response to a request of personalizing an initial load application program from said smart card issuance managing system to a specific application managing system, and at least a part of said personalized application program or a command for personalizing said application program are encrypted with said first key.

16. A smart card issuance system as claimed in claim 15, wherein said smart card issuance managing system and said smart card issuance bureau managing system have a second key common to each other, and said smart card issuance managing system transmits a command for personalizing said application program or said personalized application program and smart card issuance information encrypted with said second key to said smart card issuance bureau managing system.

17. A smart card issuing system as claimed in claim 15, wherein said smart card issuance managing system and said smart card issuance bureau managing system have a second key common to each other, and said smart card issuance managing system operates to encrypt a command for personalizing said received application program or said personalized application program and said smart card issuance information with said second key and transmit said encrypted result to said smart card issuance bureau managing system.

18. A smart card issuing system as claimed in claim 15, wherein one or more of said first key are prepared, or said first key is a derivation key from a master key.

19. A smart card issuing system as claimed in claim 16, wherein one or more of said second key are prepared, or said second key is a derivation key from a master key.

20. A smart card issuing system as claimed in claim 16, wherein the data encrypted with said first and second keys is decrypted inside of said smart card issuance bureau managing system.

* * * * *